United States Patent Office.

JOSEPH H. DICKINSON, OF JERSEY CITY, NEW JERSEY, ASSIGNOR TO EDWIN MARSHALL FOX, OF LONDON, ENGLAND.

MANUFACTURE OF FACE-HARDENED ARMOR-PLATE.

SPECIFICATION forming part of Letters Patent No. 581,903, dated May 4, 1897.

Application filed October 2, 1896. Serial No. 607,701. (No specimens.)

*To all whom it may concern:*

Be it known that I, JOSEPH H. DICKINSON, of Jersey City, New Jersey, have invented a certain Improvement in the Process of Locally Softening Hard-Faced Armor-Plate, of which the following is a specification.

In the manufacture of Harveyed armor-plates, which has now been carried on for a period of upward of five years, much difficulty has been encountered in obtaining soft places in those parts of the plates requiring to be machined or to be provided with bolt-holes. As is well known, steel subjected to treatment by the Harvey process becomes so intensely hard on the surface that no drill or tool can machine it. Various attempts have been made to avoid or overcome this difficulty. Thus during the supercarburizing operation the parts of the plate where holes or soft spots were required have been kept covered with fire-clay to prevent their impregnation with carbon. This method proved objectionable and has been discountenanced by naval authorities, because, owing to the fact that it was not always practicable before the plate was finished to determine exactly where the holes or soft spots were required, unnecessarily large areas of the plate were left soft, with the obvious disadvantage of leaving such areas susceptible of penetration by projectiles. It has also been attempted to soften the hardened plates locally by directing the flame of an oxyhydrogen-blowpipe or other intensely-concentrated flame of high heating power against the places to be softened and heating them to a red heat; but it was found that the moment the flame was removed the thus-heated places chilled almost instantly and remained as hard as ever, and such attempts were therefore abandoned as failures. The electric current has also been employed to secure the result sought for in two different ways—to wit, either by fusing or burning a hole through the plate where a bolt-hole was required or by rapidly heating the spot required to be softened to a red heat or even a higher heat by directing through it a large volume of current and then gradually and slowly diminishing the current and thereby annealing the heated metal. The latter method is the most effective of those heretofore employed, but is expensive and involves the provision of a costly plant.

The described attempts to locally soften armor-plate have proceeded upon the theory that very high heat was indispensable. In this belief it has been sought to heat the steel locally to a very high degree, supposedly the higher the better, the result being that when the source of heat was removed the previously-heated places in the plate chilled back hard again. Hence the necessity for the device employed in the last-mentioned electrical method—to wit, the device of gradually diminishing the strength of the current and thus slowly diminishing the temperature and thereby annealing the previously-overheated part of the plate.

My invention consists in heating the part of the plate which is to be softened to a temperature such as is indicated by a dark-blue color, and hence a temperature far lower than that heretofore considered necessary, and in the suddenly removing the source of heat and allowing the heated place to cool.

In my process it is essential that the metal shall not be heated to the temperature of red heat. I quickly remove the source of heat, preferably before the temperature of 700° Fahrenheit is attained. When this is done, it will be found that the heated spot, although it will cool quickly, will remain soft and toolable.

In practice I may employ the oxyhydrogen-blowpipe, which I find will in from two to five minutes bring the spot intended to be softened to the required temperature for softening. An occasional removal of the flame for a second or two is permissible for the observation of the spot which is being heated, which will exhibit the well-known tints accompanying variations in the temperature of steel, the pale yellow, the straw color, the yellow, the brown, the purple, and, as the temperature becomes more elevated, the dark blue, which latter color begins to be noticeable when the temperature of about 580° Fahrenheit is reached. The best result is secured by removing the source of heat when the metal assumes the dark-blue color, although approximately good results may be attained even if the source of heat be removed either just before the dark-blue color becomes observable or if the temperature be raised so far as to make the metal assume a light or even the greenish tint. If the spot should be heated to red heat, which may be done in a few minutes by the oxyhydrogen-blowpipe and which was, in fact, done by those who have heretofore attempted to locally soften armor-plate by the use of the blowpipe, and the heat then removed, the spot will be found to be untoolable. In cases where the depth of supercarburization makes it desirable, as in the thicker harveyed plates, it will be found advantageous to first soften, as before described, the place which is to be drilled and then drill into it a short distance and subsequently repeat the softening operation once or even twice more.

It will be understood that in lieu of the oxyhydrogen flame I may employ the flame of a mixture of oxygen gas with any suitable gas or gases, compressed or otherwise—such, for instance, as acetylene or any of the ordinary illuminating or heating gases—or I may locally heat the plate by means of electricity or by any other means, provided care is taken not to allow the metal to be heated too high and to remove the source of heat when the blue color is reached.

In cases where it is desired to construct harveyed plates with port-holes or the like the same process is carried out. After softening the plate locally I bore out a series of holes arranged in a circle, (or other form that the aperture is to take,) so that the intermediate part may be removed, leaving the aperture as may be designed. I may also similarly soften the edges of plates, so that they may be machined instead of being ground by the emery-wheel, as is now practiced.

It will be perceived that by my method I can readily, easily, and inexpensively locally soften armor-plates when in position on the ship.

Although my invention is specially intended to apply to the manufacture of face-hardened armor-plates it is also applicable to the local softening of any other face-hardened steel articles—such as, for example, railway-tires, forging-dies, and steel rolls.

What I claim as my invention is—

1. In the manufacture of armor-plates or other articles of harveyed or other face-hardened steel the process hereinbefore described of locally softening parts to be drilled, planed, chipped, or otherwise tooled, which process consists in heating the said parts to such a temperature that they exhibit a dark-blue color, and in then at once removing the source of heat and allowing said parts to cool.

2. In the manufacture of armor-plates or other articles of harveyed or other face-hardened steel the herein-described process of locally softening parts of said face-hardened articles to enable such parts to be drilled, planed, chipped or otherwise tooled, which process consists in heating the part to be softened to a temperature not exceeding 700° Fahrenheit, by directing against it a concentrated flame, and in permanently removing said flame when the said part is at a temperature which will permit said part to chill without a substantial rehardening of the metal.

JOS. H. DICKINSON.

Witnesses:
W. H. BOUGHTON,
E. GATTERER.